Jan. 30, 1968  J. R. SHIELDS  3,365,913
ROTARY SHAFT COUPLING DEVICE
Filed Oct. 28, 1965  2 Sheets-Sheet 2

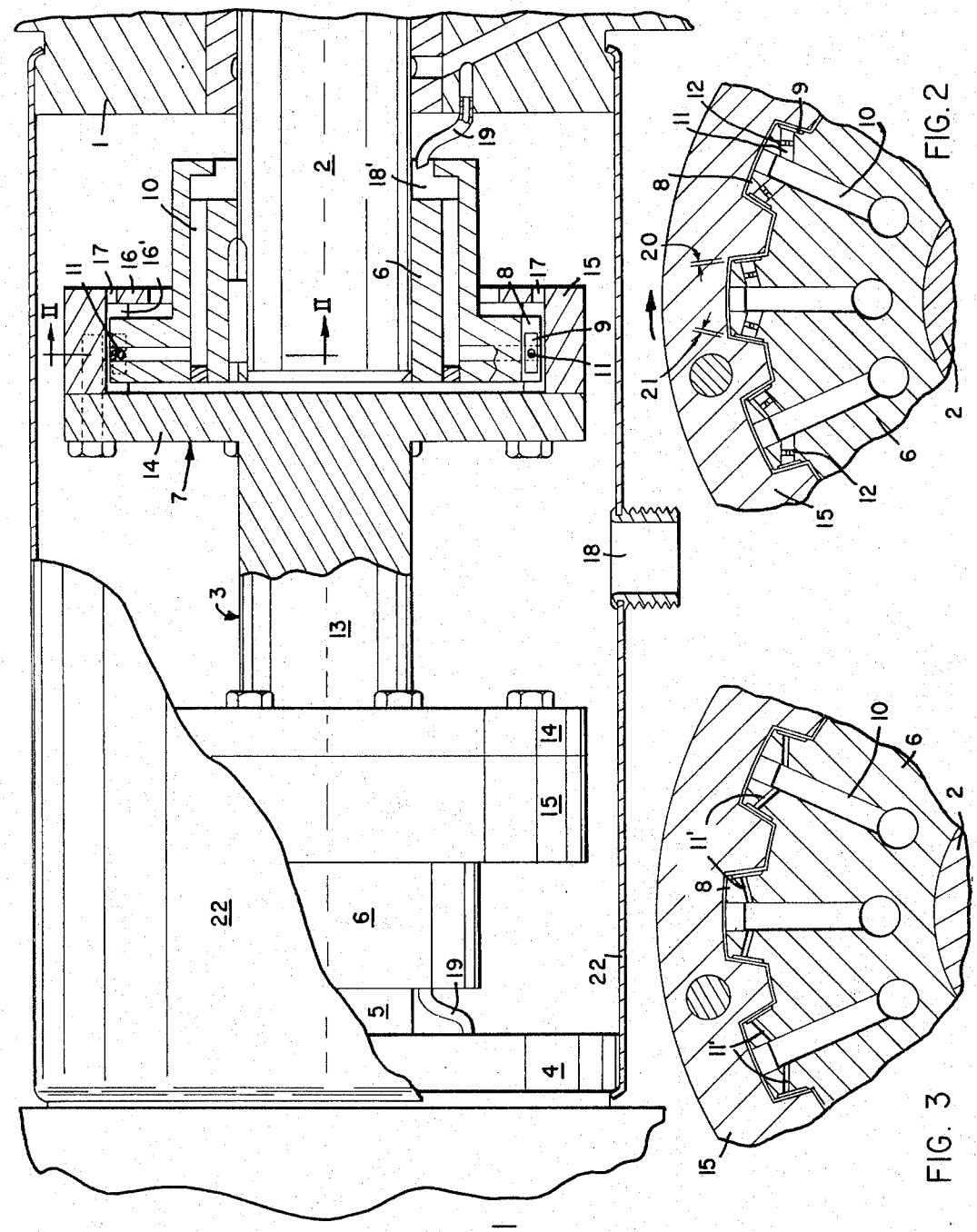

INVENTOR.
JAMES R. SHIELDS.
BY *J Raymond Curtin*
ATTORNEY.

United States Patent Office 3,365,913
Patented Jan. 30, 1968

3,365,913
ROTARY SHAFT COUPLING DEVICE
James R. Shields, Pitcairn, Pa., assignor to Carrier
Corporation, Syracuse, N.Y., a corporation of
Delaware
Filed Oct. 28, 1965, Ser. No. 505,537
7 Claims. (Cl. 64—9)

ABSTRACT OF THE DISCLOSURE

A toothed coupling for drivably connecting a driving and a driven shaft, the flanks of the driving teeth having recesses formed therein to accommodate lubricant under pressure to prevent metal to metal contact of mating teeth.

---

This invention relates broadly to coupling devices. More particularly, this invention relates to a coupling device for connecting approximately axially aligned shafts, one of which is a driver shaft and the other is a driven shaft. Still more particularly this invention relates to a shaft coupling employing high pressure lubricant to minimize friction and wear on the meshing elements of the coupling.

The transmission of rotary motion through a coupling between high speed, high horsepower rotary machines poses serious problems. The coupling must have sufficient structural strength to transmit high torque loads, be flexible enough to compensate for minor shaft misalignment, and yet be as small as possible to minimize overhung weight. One of the most desirable couplings for use in high speed, high horsepower applications employs a spacer shaft between the driving and driven shafts. In one embodiment of this coupling, the spacer shaft has spaced grooves formed in the cylindrical surface at each end thereof which mesh with spaced projections formed in hubs which are solidly mounted on the machine shafts. The spacer shaft grooves and the hub projections are formed to enable the spacer shaft to slide axially within the hub projections and also allow slight angular displacement between the spacer shaft and the machine shafts to compensate for misalignment.

Another embodiment of this coupling employs a flexible quill shaft as the spacer. One end of the quill shaft has spaced grooves formed in the cylindrical surface of the shaft which mesh with spaced projections formed in a hub solidly mounted on one of the machine shafts. The other end of the spacer shaft has a flange formed thereon to provide a solid non-flexible connection with a hub solidly mounted on the other machine shaft. In this embodiment, the flexible quill shaft is employed to compensate for parallel and/or angular misalignment of the shafts while the spacer quill shaft grooves and the hub projections enable the quill shaft to slide axially within the hub projections to compensate for axial movement therebetween.

Because either of the described couplings must be of small diameter to minimize overhung weight, the transmission of rotation at high speed and high horsepower produces a torque force on the hub projections so great that friction between the spacer shaft grooves and the hub projections prevents relative movement therebetween and destroys the effectiveness of the couplings to compensate for shaft misalignment without high reactive forces on the machine journal and thrust bearings. If the hubs do slide relative to the spacer shafts, the high frictional forces cause excessive wear on the mating faces of the hub projections and spacer shaft grooves and can also cause thrust bearing failures.

The chief object of this invention is to provide a small diameter shaft coupling device which is flexible at high loads.

Another object of this invention is to provide a shaft coupling employing a lubricant film between the moving elements thereof to minimize friction therebetween.

A further object of this invention is to provide a method for transmitting torque from the first shaft to the second shaft through a spacer shaft without metal to metal contact of the driving elements.

The objects of this invention are attained by providing at least one hub having spaced projections thereon, solidly mounted on a machine shaft. A spacer shaft assembly disposed between said hub and the second machine shaft to provide a driving connection therebetween has spaced grooves on at least one end thereof for mating engagement with the projections on the hub.

The flanks of the projections on the hubs have relieved portions therein to provide a cavity for the reception of high pressure lubricant to form a thin layer of oil between the spacer shaft grooves and the hub projections so that there is no metal to metal contact therebetween.

Other objects and features of this invention will be apparent from a consideration of the ensuing specifications and drawings in which:

FIGURE 1 is an elevational view, partially in section of one embodiment of the shaft coupling forming the subject of this invention.

FIGURE 2 is a fragmentary view in section, taken along lines II—II of FIGURE 1.

FIGURE 3 is a fragmentary view in section, of another embodiment of the invention showing the toothed hub and mating spacer shaft portion of the coupling.

Figure 5:
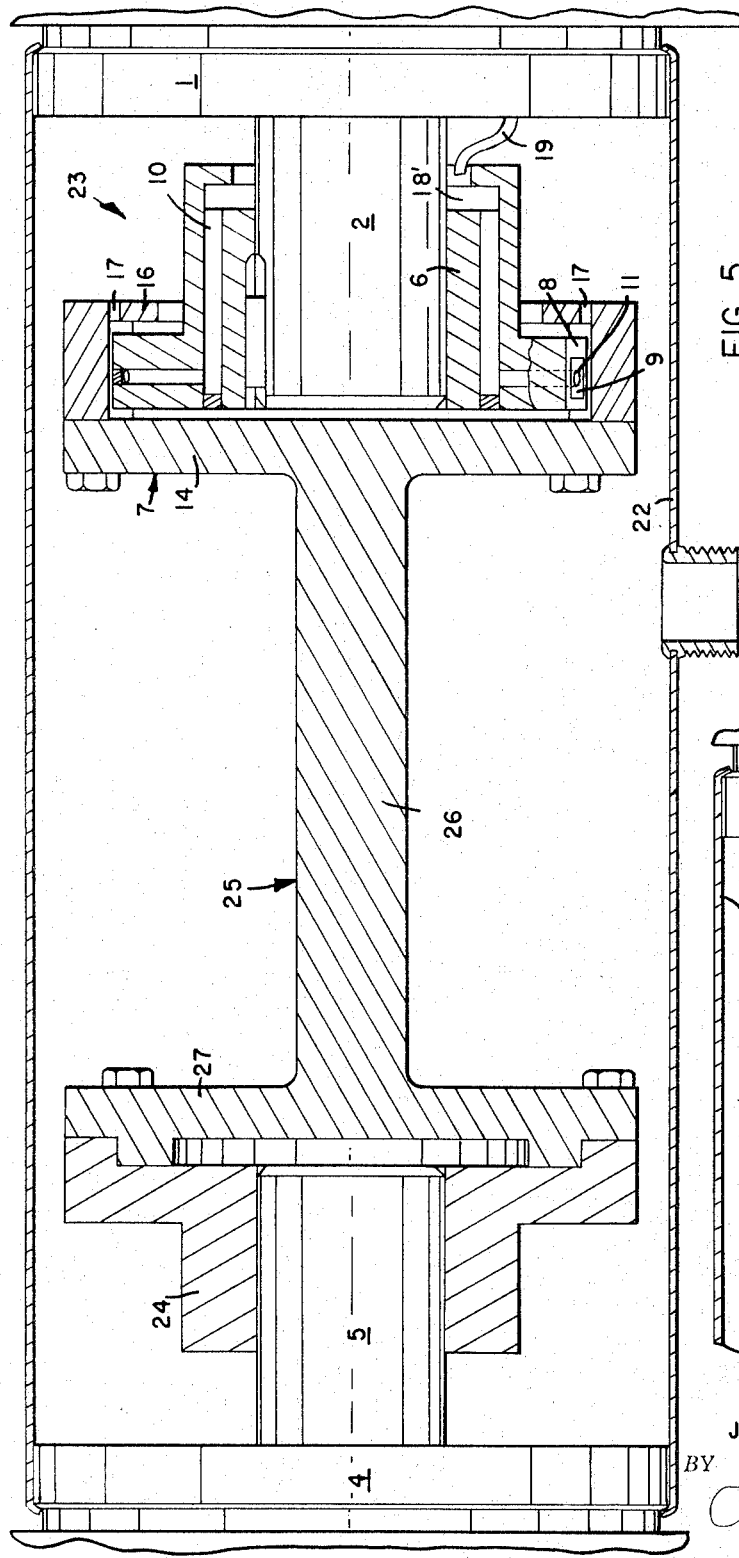
FIGURE 5 is an elevational view partially in section of a further embodiment of the shaft coupling forming the subject of this invention.

Referring more particularly to the drawings, FIGURE 1 shows a rotary machine 1 such as an electric motor or gas turbine having therein a first shaft 2. Drivingly connected to rotary machine 1 through coupling 3 is a rotary machine 4 such as a compressor, having a second shaft 5. Coupling 3 comprises hubs 6 rigidly mounted on shafts 2 and 5, coupling spacer shaft assembly 7 and coupling housing 22. Hubs 6 are mounted on shafts 2 and 5 by any suitable means such as a shrink fit. Hubs 6 have spaced projections or teeth 8 thereon. The flanks of the teeth have relieved portions therein, hereinafter referred to as pressure pads 9. Hubs 6 have supply oil passages 10 therein communicating with pressure pad oil passages 11 to supply oil to pressure pads 9. Pressure pad oil passages 11 have orifices 12 therein to control oil flow to the pressure pads 9 as shown in FIGURE 2.

Spacer shaft assembly 7 comprises spacer shaft 13 having flanges 14 on the ends thereof. Annular members 15 having circumferentially spaced grooves 16' therein are bolted to flanges 14. Annual members 15 have lip portions 16 thereon with drain passages 17 therein.

Coupling housing 22 completely encloses the rotary shafts and couplings. A drain 18 is provided in housing 22 to drain oil from the coupling to the main oil sump of the machines.

Considering the operation of this coupling with the parts assembled as shown in FIGURE 1, oil provided at opening 18' communicating with oil passages 10 by a separate oil line 19 as illustrated or by shaft bearing oil throwoff, is caused to flow through passages 10 by centrifugal force resulting from the high rotating speeds. This creates a high oil pressure in passages 11 and at pressure pads 9.

Referring to FIGURE 2, when the hub illustrated is driving the coupling in a clockwise direction, oil flow through passages 11 will be restricted by clearance 20 and by left orifice 12. Under the operating conditions described above, shaft load will decrease clearance 20 and increase clearance 21. Thus the left orifice 12 will restrict oil flow to the left and clearance 21 will provide an oil passage therebetween larger than orifice 12 and prevent any pressure buildup at left pad 9. However, small clearance 20 will provide a greater restriction to oil flow than right orifice 12, allowing full line pressure to be built up at right pressure pad 9.

Since oil flow through the clearance space 20 is proportional to the clearance between the teeth, a decreased clearance resulting from a higher torque force will result in decreased flow and a higher pressure at right pressure pad 9 which will counteract the higher torque force to prevent metal to metal contact between the teeth.

Oil flowing through pressure pad clearances 20 and 21 drains through passages 17, is thrown out against housing 22, collects at the bottom of the housing and is drained to the main oil supply reservoir for the rotary machines.

It can be appreciated that the oil passages connecting the pressure pads and the oil duct 10 may be made smaller to act as oil flow restrictions as illustrated at 11' in FIGURE 3 rather than the embodiment described and illustrated in FIGURE 2 where passages 11 and orifices 12 are employed.

FIGURE 5 illustrates another embodiment of my invention and shows a rotary machine 1 such as an electric motor or gas turbine having therein a first shaft 2. Drivably connected to rotary machine 1 through coupling 23 is a rotary machine 4 such as a compressor, having a shaft 5. Coupling 23 comprises hub 6 solidly mounted on shaft 2, hub 24 solidly mounted on shaft 5, coupling spacer shaft assembly 25, and coupling housing 22. Hubs 6 and 24 are mounted on shafts 2 and 5 by any suitable means such as a shrink fit. Hub 6 and the portion of the spacer shaft assembly 25 in engagement therewith are identical to the corresponding portions of the aforementioned coupling. Shaft 26 of spacer shaft assembly 25 has a flange 27 on one end thereof solidly bolted to hub 24.

Considering the operation of this embodiment with the parts assembled as shown in FIGURE 5, the flexible shaft 26 compensates for any misalignment. The toothed portion of the coupling allows axial movement of the coupling. Oil is provided to the toothed portion of this coupling as explained in the description of the first embodiment of my invention to prevent metal to metal contact of the mating elements.

Figure 4:
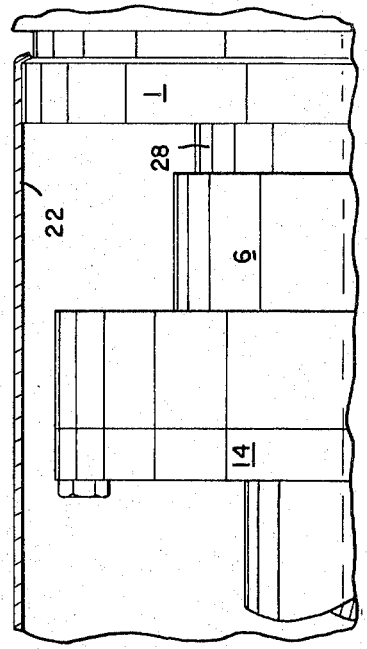
FIGURE 4 is a fragmentary view of a further embodiment of the invention showing the toothed hub and mating shaft portion of the coupling wherein alternate means are provided for forwarding high pressure lubricant to the hub projections.

For application of my invention on lower speed machines where pressure due to centrifugal force would be inadequate, the oil supply system of the machine can supply high pressure oil to the coupling through a rotary or sleeve fitting 28 on the shaft as illustrated in FIGURE 4. Sleeve 28 in FIGURE 4 is illustrative of any well-known type of fitting for supplying lubricant to a rotary shaft.

It can be appreciated that the couplings described and illustrated can be driven clockwise as described or counterclockwise, the relative clearance being reversed when the coupling is driven counterclockwise. Thus, metal to metal contact of the coupling elements will be avoided in either direction. If the couplings were to be driven in only one direction, pressure pads would only be necessary on the driving side of the teeth and restrictions in the oil passages would be unnecessary.

While I have described the preferred embodiments of my invention, it is to be understood that the invention is not limited thereto, but may be otherwise embodied within the scope of the following claims.

I claim:
1. A coupling for drivably connecting a first rotary shaft to a second rotary shaft comprising,
   a first-shaft engaging hub member,
   a second-shaft engaging hub member, at least one of said hubs having a plurality of spaced teeth thereon,
   said teeth having pressure pads formed in the flanks thereof,
   a spacer shaft disposed between said hubs for drivably connecting said hubs, said shaft having a plurality of spaced grooves on at least one end thereof for mating engagement with said hub teeth,
   means for providing high pressure lubricant to said pads to maintain said teeth spaced from said grooves to prevent metal to metal contact therebetween.

2. A coupling according to claim 1 in which both said hub members have a plurality of spaced teeth thereon with pressure pads formed in the flanks thereof,
   said spacer shaft assembly having a plurality of spaced grooves formed on both ends thereof for mating engagement with the teeth on said hub members,
   means for providing high pressure lubricant to the pads in both said hub members to maintain said teeth spaced from said grooves to prevent metal to metal contact therebetween.

3. A coupling for drivably connecting a first rotary shaft to a second rotary shaft according to claim 1,
   said first-shaft engaging hub member having a plurality of teeth thereon,
   said spacer shaft having a flange at one end thereof for solid, non-flexible engagement with said second-shaft engaging hub, said spacer shaft having a plurality of spaced grooves on the other end thereof for mating engagement with said first-shaft engaging hub teeth.

4. A coupling according to claim 1 in which said means for providing high pressure lubricant to said pads comprises,
   a source of low pressure lubricant,
   a lubricant cavity near the centerline of the hub for receiving said low pressure lubricant,
   a lubricant passage disposed between said cavity and each of said pads to provide lubricant to said pads at an increased pressure due to the centrifugal force exerted on said lubricant.

5. A coupling according to claim 4 in which said teeth have pressure pads on each flank thereof,
   said lubricant passage comprising a passage having a relatively large cross sectional area for providing lubricant from said cavity to a central location within each tooth and two pressure pad passages for providing lubricant flow from said central location to the two pressure pads on each tooth.

6. A coupling according to claim 5 in which said pressure pad passages have orifices therein to restrict flow of lubricant therethrough.

7. A coupling according to claim 5 in which said pressure pad passages are of a small cross sectional area relative to the area of the lubricant duct to provide a restriction to the flow of lubricant therethrough.

References Cited

UNITED STATES PATENTS

| | | | |
|---|---|---|---|
| 2,305,439 | 12/1942 | Miller | 64—26 |
| 2,320,353 | 6/1943 | Ernst | 184—6 |
| 2,726,523 | 12/1955 | Zrodowski | 64—9 |
| 2,730,877 | 1/1956 | Suberkrub | 64—26 |
| 3,168,013 | 2/1965 | Williamson | 308—5 |
| 3,231,319 | 1/1966 | Porath | 308—5 |

FOREIGN PATENTS

| | | |
|---|---|---|
| 667,217 | 2/1952 | Great Britain. |

HALL C. COE, *Primary Examiner.*